(12) United States Patent
Kohara

(10) Patent No.: US 10,448,156 B2
(45) Date of Patent: Oct. 15, 2019

(54) CONTENT DELIVERY APPARATUS, CONTENT DELIVERY SYSTEM AND CONTENT DELIVERY METHOD

(71) Applicant: Yamaha Corporation, Hamamatsu-shi, Shizuoka-Ken (JP)

(72) Inventor: Osamu Kohara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/724,700

(22) Filed: Oct. 4, 2017

(65) Prior Publication Data

US 2018/0027328 A1   Jan. 25, 2018

Related U.S. Application Data

(63) Continuation of application No. PCT/JP2016/073061, filed on Aug. 5, 2016.

(30) Foreign Application Priority Data

Aug. 19, 2015   (JP) .................................. 2015-162183

(51) Int. Cl.
*H04R 3/12* (2006.01)
*H04N 21/4363* (2011.01)
*H04N 21/43* (2011.01)
*H04N 21/231* (2011.01)
*H04R 27/00* (2006.01)
(Continued)

(52) U.S. Cl.
CPC ............ *H04R 3/12* (2013.01); *H04N 21/231* (2013.01); *H04N 21/4307* (2013.01); *H04N 21/43615* (2013.01); *H04N 21/43635* (2013.01); *H04N 21/43637* (2013.01); *H04R 27/00* (2013.01);
(Continued)

(58) Field of Classification Search
None
See application file for complete search history.

(56) References Cited

U.S. PATENT DOCUMENTS

2005/0138666 A1   6/2005   Narusawa et al.
2006/0253888 A1   11/2006   Senga et al.
(Continued)

FOREIGN PATENT DOCUMENTS

JP    2004-266330 A    9/2004
JP    2005-148565 A    6/2005
(Continued)

OTHER PUBLICATIONS

International Search Report (PCT/ISA/210) issued in PCT Application No. PCT/JP2016/073061 dated Oct. 18, 2016 with English translation (2 pages).
(Continued)

*Primary Examiner* — Qin Zhu
(74) *Attorney, Agent, or Firm* — Crowell & Moring LLP

(57) ABSTRACT

A content delivery apparatus includes an external input portion, a content reception portion and a delivery portion. To the external input portion, first content having at least a fundamental component is inputted. The content reception portion receives second content having a fundamental component and an extended component. When delivering the first content, the delivery portion delivers the fundamental component of the first content to a client apparatus more than once.

17 Claims, 5 Drawing Sheets

(51) Int. Cl.
*H04N 21/436* (2011.01)
*G10L 19/24* (2013.01)
*G10L 19/16* (2013.01)

(52) U.S. Cl.
CPC ............ *G10L 19/167* (2013.01); *G10L 19/24* (2013.01); *H04R 2420/07* (2013.01)

(56) References Cited

U.S. PATENT DOCUMENTS

| | | | | |
|---|---|---|---|---|
| 2007/0058762 | A1* | 3/2007 | Hudson | H04H 20/28 |
| | | | | 375/354 |
| 2007/0263985 | A1* | 11/2007 | Ikeda | G11B 20/10527 |
| | | | | 386/241 |
| 2009/0110369 | A1* | 4/2009 | Takahashi | G10L 19/20 |
| | | | | 386/357 |
| 2010/0284389 | A1* | 11/2010 | Ramsay | G06F 17/30017 |
| | | | | 370/338 |
| 2015/0319550 | A1* | 11/2015 | Fujita | H04S 7/30 |
| | | | | 381/303 |

FOREIGN PATENT DOCUMENTS

| | | |
|---|---|---|
| JP | 2009-163868 A | 7/2009 |
| JP | 2010-88029 A | 4/2010 |

OTHER PUBLICATIONS

Japanese-language Written Opinion (PCT/ISA/237) issued in PCT Application No. PCT/JP2016/073061 dated Oct. 18, 2016 (3 pages).
Japanese-language Office Action issued in counterpart Japanese Application No. 2015-162183 dated Jun. 18, 2019 with English translation (six (6) pages).

* cited by examiner

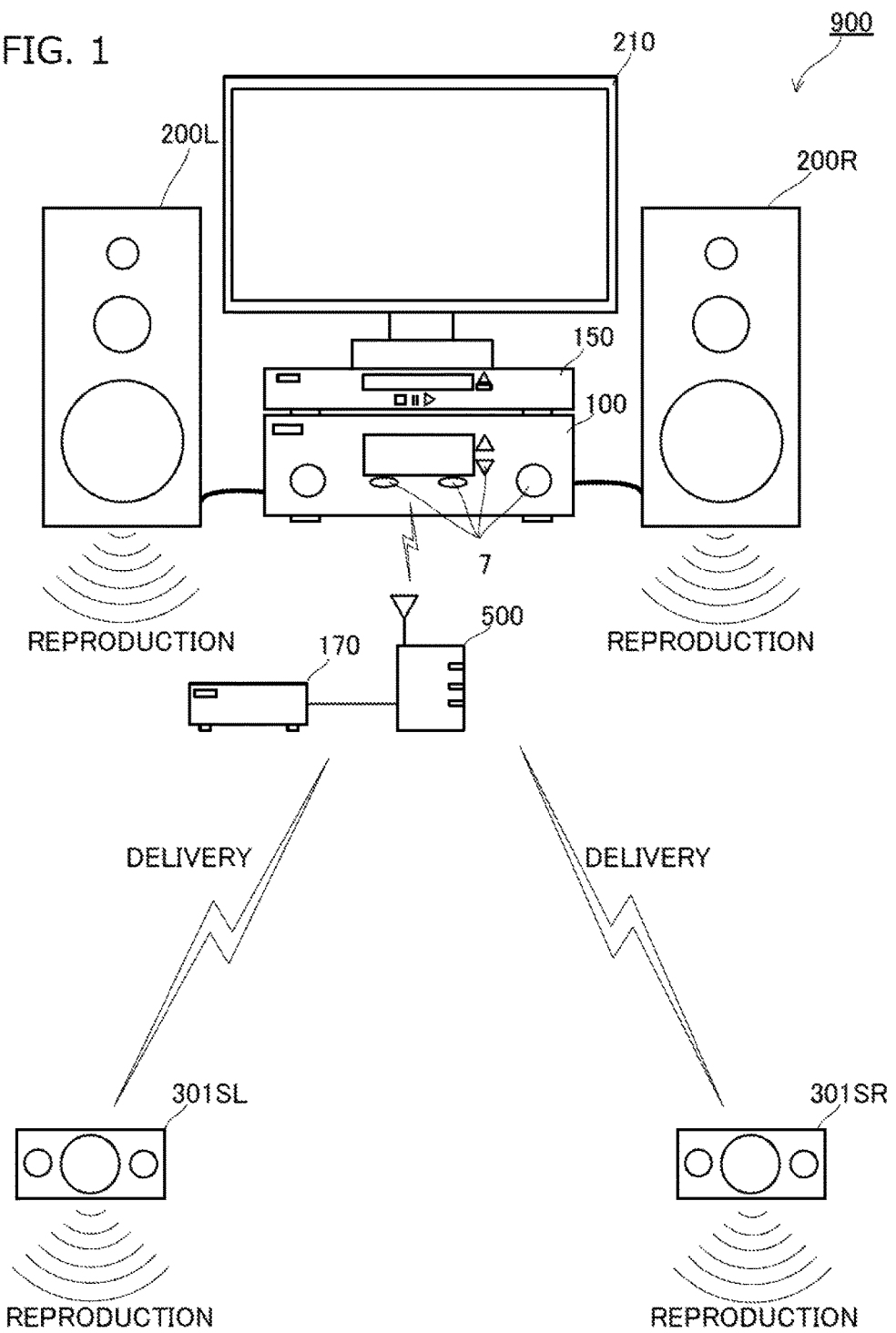

CONTENT DELIVERY APPARATUS, CONTENT DELIVERY SYSTEM AND CONTENT DELIVERY METHOD

CROSS REFERENCE TO RELATED APPLICATIONS

The present application is a continuation application of International Patent Application No. PCT/JP2016/073061, filed on Aug. 5, 2016, which claims priority to Japanese Patent Application No. 2015-162183, filed on Aug. 19, 2015. The contents of these applications are incorporated herein by reference in their entirety.

BACKGROUND OF THE INVENTION

1. Field of the Invention

The present invention, in one aspect thereof, relates to a content delivery apparatus that delivers content to a client apparatus.

2. Description of the Related Art

JP 2005-148565 A (hereinafter referred to as Patent Literature 1) discloses a content delivery apparatus that delivers content, and a client apparatus that reproduces the delivered content.

The content delivery apparatus disclosed in Patent Literature 1 includes a hard disc that stores content, and a FIFO device that temporarily holds the content having been read out from the hard disc. The content delivery apparatus disclosed in Patent Literature 1 achieves synchronization of the content reproduction at its own devices and each client apparatus by adjusting a time for which the content is temporarily held in the FIFO device.

As stated above, in the content delivery apparatus of Patent Literature 1, the synchronous reproduction has been achieved at a client apparatus as delivery destination by causing the FIFO device to temporarily store the content data and therethrough controlling read-out amount from the hard disc. However, in a case where content inputted from an external input terminal is delivered, it can occur that the content delivery apparatus reproduces, for example, a video of content that is continuously output from an external optical disc device and each client apparatus reproduces an audio of the content. In cases where content is inputted from outside as in this case, the reproduction of audio by each client apparatus may be delayed compared with the reproduction of video by the content delivery apparatus. Therefore, it is necessary for the reproduction of audio by each client apparatus to reduce a delay from the input to the content delivery apparatus to the output therefrom.

Thus, the present invention, in one aspect thereof, is directed to providing a content delivery apparatus that chooses an optimal method of delivering content depending on the content that becomes an object of delivery.

SUMMARY OF THE INVENTION

A content delivery apparatus includes an external input portion, a content reception portion and a delivery portion. To the external input portion, first content having at least a fundamental component is inputted. The content reception portion receives second content having a fundamental component and an extended component. The delivery portion, when delivering the first content, delivers the fundamental component of the first content to a client apparatus more than once.

A content delivery apparatus in one aspect of the present invention is capable of choosing an optimal method of delivering content depending on the content that becomes an object of delivery.

BRIEF DESCRIPTION OF THE DRAWINGS

FIG. 1 is an illustration to explain an outline of a content delivery system according to an embodiment 1 of the present invention.

DETAILED DESCRIPTION OF THE PREFERRED EMBODIMENTS

Figure 2A:
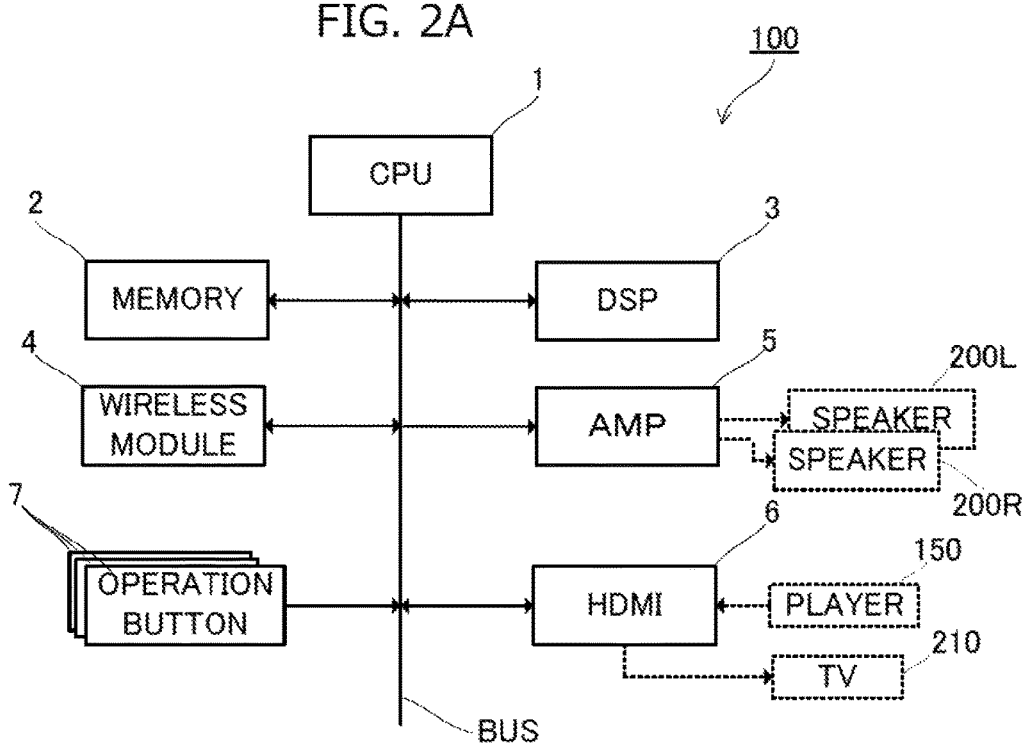
FIG. 2A is a hardware block diagram showing a part of a configuration of an AV receiver.

A content delivery apparatus according to an embodiment of the present invention includes an external input portion, a content reception portion and a delivery portion. To the external input portion, first content having at least a fundamental component is inputted. The content reception portion receives second content having a fundamental component and an extended component. The delivery portion, when delivering the first content, delivers the fundamental component of the first content to a client apparatus more than once.

The external input portion, for example, has a connector to which a composite cable is connected. However, the external input portion may have a network interface through which a wireless signal that transmits the first content is inputted.

The first content inputted to the external input portion is, for example, a part (audio data) of content that is output from an optical disc device. In some cases, the optical disc device outputs video data to another apparatus (for example, television), and outputs audio data to the content delivery apparatus. In such cases, real-time reproduction is required in order that reproduction of the audio at each client apparatus is not delayed in relation to reproduction of the video on the television's side.

The second content received by the content reception portion is stored, for example, in a NAS (Network Attached Storage), or in a built-in storage of the content delivery apparatus. In the case of such second content, it is not necessary to deliver the audio data when outputting the video data to another apparatus (for example, television); therefore, even when the second content is buffered, there is no occurrence of a situation where only the reproduction at the client apparatus is delayed.

The content delivery portion delivers the fundamental component and the extended component of the second content. For example, the delivery portion, using the WavPack codec which is an audio compression codec, divides the audio data into the fundamental component and the extended component, and produces two compressed data.

Using the compressed data of only the fundamental component still makes it possible to reproduce the audio. Using the compressed data of both the fundamental component and the extended component makes it possible to reproduce the audio without any loss due to compression.

When delivering the second content that is received by the content reception portion, the content delivery portion delivers the fundamental component and the extended component of the second content after temporarily holding thereof in a buffer. That is, the delivery portion buffers and then delivers the second content, for which real-time reproduction is not required. This enables the content delivery apparatus to surely synchronize the reproduction of the content between a number of client apparatus. Further, receiving the fundamental component and the extended component of the second content, the client apparatus can reproduce high quality content.

The delivery portion delivers the first content (the first content, for which real-time reproduction is required) that is inputted to the external input portion immediately after the input without carrying out buffering. Further, the delivery portion, when delivering the first content, delivers the fundamental component of the first content more than once. This enables the client apparatus to receive the fundamental component of the first content more surely, even though there is a possibility of occurrence of omission of data to be delivered. Since the client apparatus can reproduce the content using only the fundamental component that can be received more surely, retransmission request for the first content becomes unnecessary. Since the content delivery apparatus renders the time to deal with the retransmission request for the first content unnecessary, a delay in content reproduction at the client apparatus can be prevented.

Figure 2B:
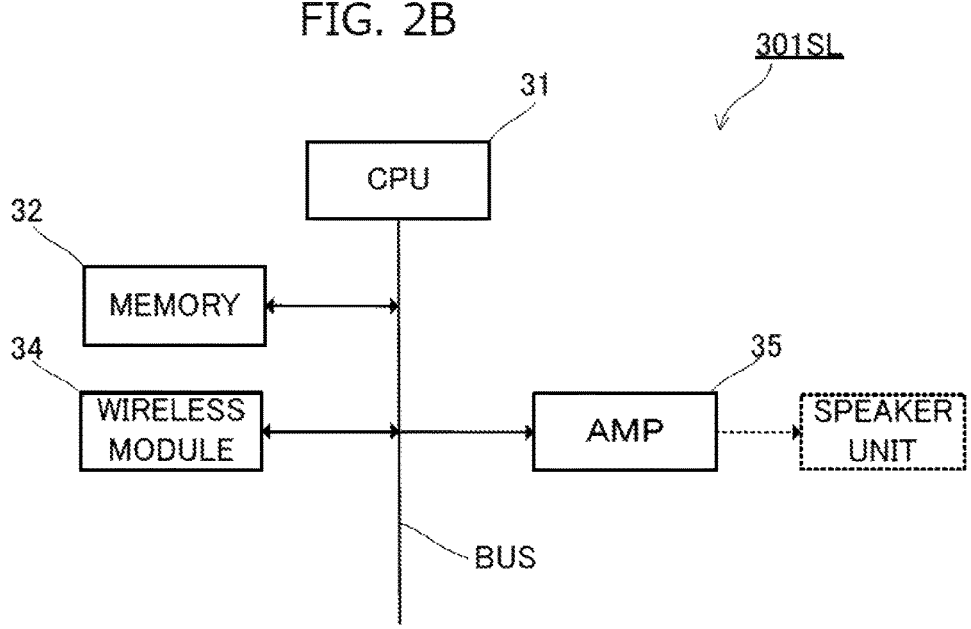
FIG. 2B is a hardware block diagram showing a part of a configuration of a wireless speaker.

A content delivery system 900 according to an embodiment 1 is explained using FIGS. 1, 2A and 2B. FIG. 1 is an illustration to explain an outline of the content delivery system 900. FIG. 2A is a hardware block diagram showing a part of a configuration of an AV receiver 100. FIG. 2B is a hardware block diagram showing a part of a configuration of a wireless speaker 301SL.

As shown in FIG. 1, the content delivery system 900 includes an AV receiver 100, a player 150, a NAS (Network Attached Storage) 170, a speaker 200L, a speaker 200R, a television 210, a wireless speaker 301SL and a wireless speaker 301SR.

The player 150 includes, for example, an optical disc drive. The player 150 outputs PCM audio source data stored on an optical disc. The NAS 170 stores a multiple number of PCM audio source data. The AV receiver 100 delivers the PCM audio source data output from the player 150 and the PCM audio source data stored in the NAS 170 to the wireless speaker 301SL and the wireless speaker 301SR. The wireless speaker 301SL and the wireless speaker 301SR are examples of the client apparatus. The AV receiver 100 in this embodiment is an example of the content delivery apparatus, and is one that selects an optimal method of delivery (delivering content) depending on the content that becomes an object of delivery.

As shown in FIG. 2A, the AV receiver 100 includes a CPU (Central Processing Unit) 1, a memory 2, a DSP (Digital Signal Processor) 3, a wireless module 4, an AMP (Amplifier) 5, a HDMI (High Definition Multimedia Interface (HDMI is a registered trademark)) 6 and a plurality of operation buttons 7. These components are connected to a common BUS.

The DSP 3 is a processor for a variety of acoustic treatments to the PCM audio source data. The wireless module 4 produces wireless signals according to Wi-Fi (a registered trademark) standard and/or the like. Also, the wireless module 4 inputs and outputs wireless signals through an antenna. This enables the wireless module 4 to transmit and receive information by means of wireless communication. The AMP 5 is a circuit to amplify audio signals. The audio signals amplified by the AMP 5 are output to the speaker 200L and the speaker 200R. To the speaker 200L, an audio signal for L channel is output. To the speaker 200R, an audio signal for R channel is output. The HDMI 6 is an interface to input and output the content. The HDMI 6 is connected to a HDMI of the player 150. The plurality of operation buttons 7 respectively output signals indicating operations when operated by a user. The memory 2 stores IP addresses of the wireless speaker 301SL and the wireless speaker 301SR. The memory 2 stores programs. The CPU 1 reads out a program from the memory 2, and executes the read-out program.

As shown in FIG. 2B, the wireless speaker 301SL includes a CPU 31, a memory 32, a wireless module 34 and an AMP 35. These components are connected to a common BUS.

The wireless module 34 produces wireless signals according to Wi-Fi (a registered trademark) standard and/or the like. Also, the wireless module 34 inputs and outputs wireless signals through an antenna. This enables the wireless module 34 to transmit and receive information by means of wireless communication. The AMP 35 is a circuit to amplify audio signals. The audio signals amplified by the AMP 35 are output to a speaker unit. The memory 32 stores programs. The CPU 31 reads out a program from the memory 32, and executes the read-out program.

The wireless speaker 301SR includes a configuration same as or similar to that of the wireless speaker 301SL. The wireless speaker 301SL receives audio data for SL channel. The wireless speaker 301SR receives audio data for SR channel.

Figure 3:
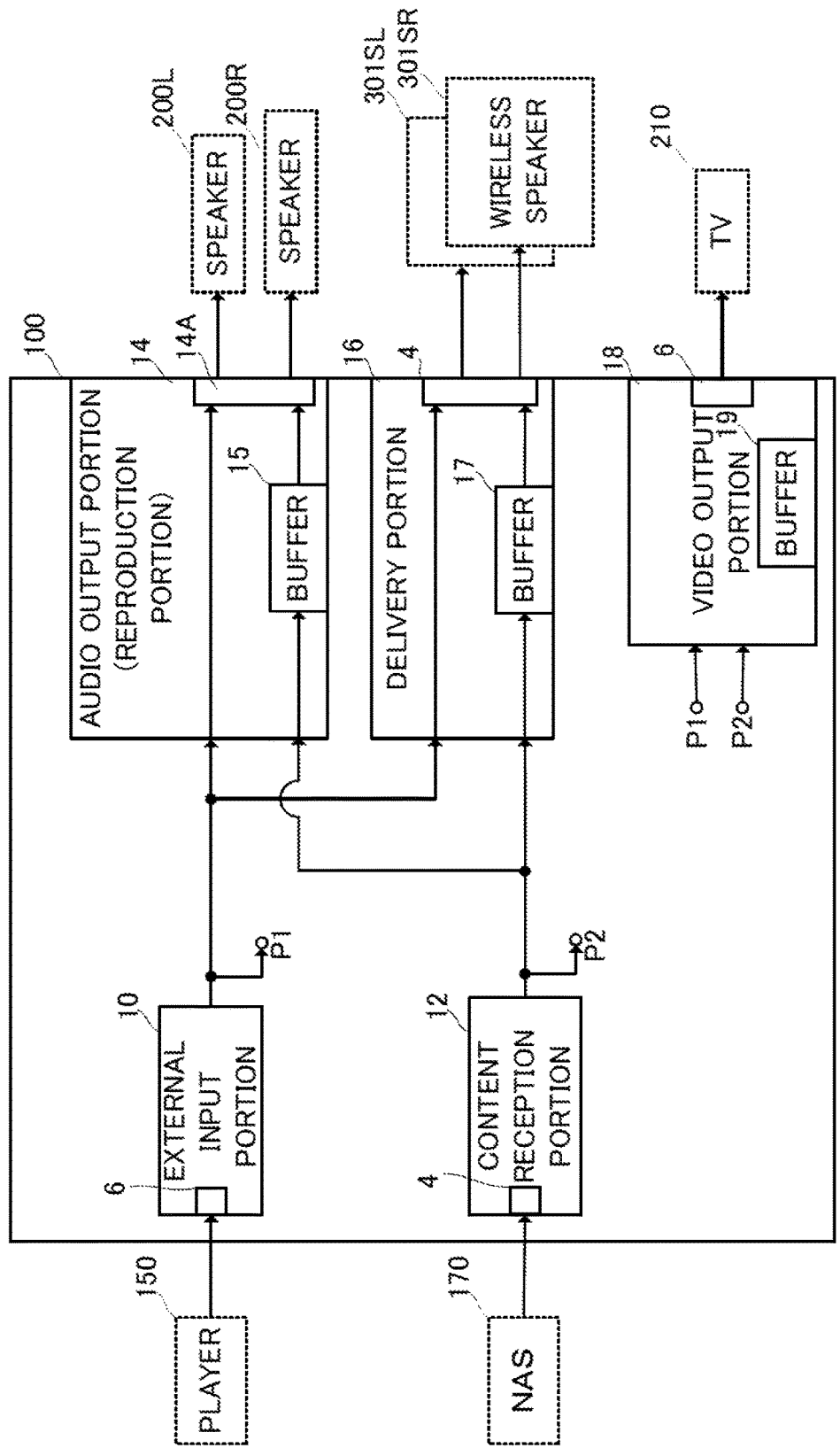
FIG. 3 is a functional block diagram showing apart of a configuration of the AV receiver.

The AV receiver 100 realizes respective functional portions shown in a functional block diagram of FIG. 3 by executing the programs.

As shown in FIG. 3, the AV receiver 100 includes, as functional portions, an external input portion 10, a content reception portion 12, an audio output portion (reproduction portion) 14, a delivery portion 16 and a video output portion 18. The external input portion 10 is realized by at least the HDMI 6 performing. The content reception portion 12 is realized by at least the wireless module 4 performing. The audio output portion 14 is realized by at least the AMP 5 and an audio output terminal 14A performing. The delivery portion 16 is realized by at least the memory 2 and the wireless module 4 performing. The video output portion 18 is realized by at least the HDMI 6 performing.

To the external input portion 10, the PCM audio source data output from the player 150 are inputted, as an example of the first content. The PCM audio source data inputted to the external input portion 10 is output to the audio output portion 14 and the delivery portion 16. The content reception portion 12 receives the PCM audio source data stored in the NAS 170, as an example of the second content. The PCM audio source data received by the content reception portion 12 is output to the audio output portion 14 and the delivery portion 16. Here, the respective PCM audio source data may undergo an acoustic treatment (for example, equalizing process) by the DSP 3 before being inputted to the audio output portion 14 and the delivery portion 16.

The audio output portion 14 performs D/A conversion of the audio data for the L channel among the inputted PCM audio source data, and then outputs thereof to the speaker 200L. The audio output portion 14 performs D/A conversion of the audio data for the R channel among the inputted PCM audio source data, and then outputs thereof to the speaker 200R.

The delivery portion 16 delivers the audio data for the SL channel among the inputted PCM audio source data to the wireless speaker 301SL. The delivery portion 16 delivers the audio data for the SR channel among the inputted PCM audio source data to the wireless speaker 301SR.

Figure 4:
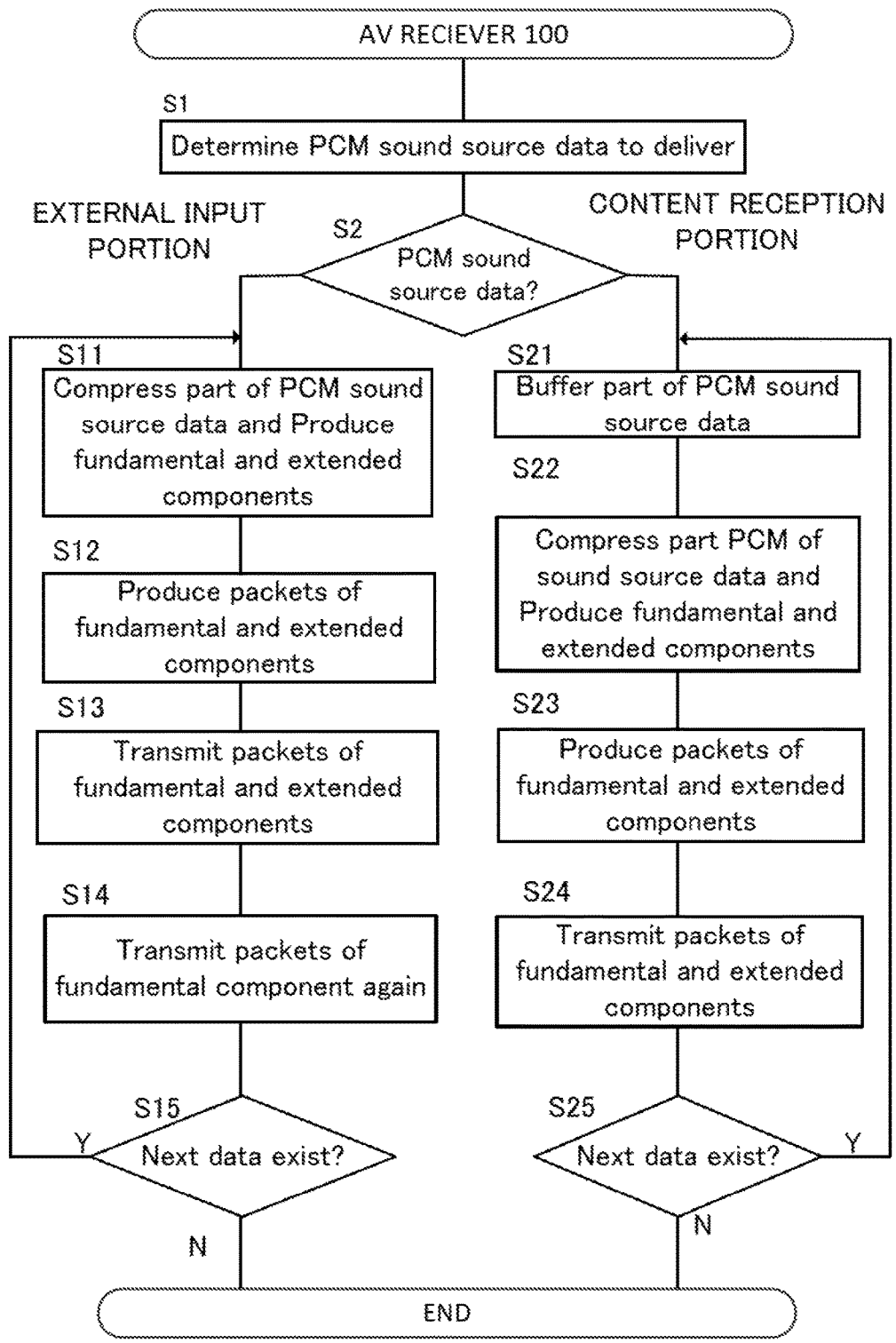
FIG. 4 is a flow chart showing an operation of the AV receiver.

The delivery portion 16 includes a FIFO type buffer (first buffer) 17 in order to prevent the delay in reproduction of the audio at the wireless speaker 301SL and the wireless speaker 301SR. The delivery portion 16, using the buffer 17, operates as follows. FIG. 4 is a flow chart showing an operation of the delivery portion 16. Here, the buffer 17 is realized by the memory 2 performing.

As shown in FIG. 4, the delivery portion 16 determines audio source data to deliver (S1). First, the delivery portion 16, based on a source select operation accepted through the plurality of operation buttons 7, determines whether to deliver the PCM audio source data output from the external input portion 10 or to deliver the PCM audio source data received by the content reception portion 12. The delivery portion 16, when determining to deliver the PCM audio source data received by the content reception portion 12, further selects PCM audio source data to deliver from the plurality of PCM audio source data stored in the NAS 170, based on the source select operation accepted through the plurality of operation buttons 7.

Subsequently, the delivery portion 16 performs a delivery process that varies depending on the source of the PCM audio source data that is determined at step S1 (S2).

[Delivery of PCM Audio Source Data Received by the Content Reception Portion]

The delivery portion 16, when determining to deliver the PCM audio source data received by the content reception portion 12 (S2: CONTENT RECEPTION PORTION), temporarily holds head data of the PCM audio source data in the buffer 17 (S21). The PCM audio source data stored in the NAS 170 are PULL-type data received by the content reception portion 12 when necessary. In other words, the PCM audio source data stored in the NAS 170 is capable of being buffered, and thus are ones that do not require real-time reproduction. Then, the delivery portion 16 buffers a desired amount of the PCM audio source data at step S21. The desired amount corresponds to, for example, an amount of the PCM audio source data for 2 seconds in reproduction time.

Then, the delivery portion 16 takes out the PCM audio source data from the buffer 17, and compresses the taken-out PCM audio source data (S22). Here, the delivery portion 16, using the WavPack codec, compresses the PCM audio source data, dividing thereof into the fundamental component and the extended component. Data of the fundamental component are produced through the irreversible compression. Using only the data of the fundamental component still makes it possible to reproduce the audio. Correcting the data of the fundamental component using data of the extended component makes it possible to restore the PCM audio source data (for example, bit rate data of 1,411 kbps) without any loss due to compression. The delivery portion 16, for example, produces the data of the fundamental component of the PCM audio source data at a bit rate of 200 kbps, and produces the data of the extended component of the PCM audio source data at a bit rate of 600 kbps.

Subsequently, the delivery portion 16 produces packets that include the produced data of the fundamental component and the extended component (S23). The delivery portion 16 transmits the produced packets (S24). These packets are transmitted to the wireless speaker 301SL and the wireless speaker 301SR through a wireless access point 500.

Each CPU 31 of the wireless speaker 301SL and the wireless speaker 301SR, upon receipt of the packets from the AV receiver 100, takes out data from the received packets. Then, the CPU 31, using the WavPack codec, restores the taken-out data. This results in the restoration of the PCM audio source data in its lossless state. After that, the CPU 31 outputs an analog audio signal that is produced from the restored PCM audio source data to the speaker unit.

The delivery portion 16 determines whether or not next data to further deliver exist (S25). The delivery portion 16 returns to step S21, if data exist next to the data it has delivered at step S24 (S25: Y). Upon return to step S21, the delivery portion 16 performs the process of steps S21-S24 to data next to the data it has delivered as objects. The delivery portion 16 ends the process, if the data it has delivered at step S24 are final data of the PCM audio source data (S25: N). That is, the delivery portion 16 performs the process of steps S21-S24 repeatedly, from the head data to tail end data of the PCM audio source data to deliver.

Additionally, while the PCM audio source data for the SL channel and the SR channel are being delivered, the audio output portion 14 outputs audio signals corresponding to the PCM audio source data for the L channel and the R channel to the speaker 200L and the speaker 200R, respectively. In this situation, the audio output portion 14 temporarily holds the PCM audio source data in a FIFO type buffer 15 (see FIG. 3), and thereafter outputs the audio signals. Time to temporarily hold the PCM audio source data for in the buffer 15, which is a second buffer, is set taking account of the time needed by the delivery portion 16 to perform the delivery process and the packet transmission, and the time needed by the wireless speaker 301SL and the wireless speaker 301SR to perform the reproduction process. This enables the speaker 200L, the speaker 200R, the wireless speaker 301SL and the wireless speaker 301SR to reproduce the PCM audio source data synchronously.

Even when a delay of 0.5 sec occurs in the buffering process (S21) of the PCM audio source data, for example, since the amount of the PCM audio source data for 2 seconds in reproduction time is temporarily held in the buffer 17, the delivery portion 16 can transmit the temporarily held PCM audio source data (S22-S24). This enables the AV receiver 100 to prevent the delay in reproduction of the PCM audio source data at the wireless speaker 301SL and the wireless speaker 301SR. Also, when a delay occurs in the buffering process (S21), the delivery portion 16 acquires a further amount of PCM audio source data from the content reception portion 12 so that the amount of the PCM audio source data for 2 seconds in reproduction time is temporarily held in the buffer 17 again.

[Delivery of Audio Data Inputted to the External Input Portion]

The PCM audio source data output from the player 150 are PUSH-type data that are sequentially output from the player 150. In other words, the PCM audio source data output from the player 150 are ones that require real-time reproduction. Here, the real-time reproduction in this embodiment means that the timing with which audio data are inputted to the external input portion 10 and the timing with which the speaker 200L, the speaker 200R, the wireless speaker 301SL and the wireless speaker 301SR reproduce the audio are generally synchronous. Therefore, in this embodiment, even a reproduction with a time difference of several ten milliseconds between the timing with which audio data are inputted to the external input portion 10 and the timing with which the respective speakers reproduce the audio is regarded to be a real-time reproduction.

The delivery portion 16, when determining to deliver the PCM audio source data inputted to the external input portion 10 (S2: EXTERNAL INPUT PORTION), compresses the PCM audio source data and produces data of the fundamental component and the extended component (S11), without buffering the head data of the PCM audio source data. This process of producing the data of the fundamental component and the extended component is the same as the process at step S22, so that explanation is omitted. Then, the delivery portion 16 produces packets that include the produced data of the fundamental component and the extended component (S12). Here, it is preferable for the delivery portion 16 to produce UDP (User Datagram Protocol) packets that are transmitted through connectionless communication so that the packets arrive at the wireless speaker 301SL and the wireless speaker 301SR faster. Then, the delivery portion 16 delivers the produced packets (S13). In the case of performing the connectionless communication, in which connection status is not confirmed by the delivery portion 16, the delivery portion 16 can transmit the packets faster. Here, the connectionless communication is, like UDP, a communication mode in which data are transmitted without confirmation of connection status.

After transmitting the packets that include the data of the fundamental component and the extended component (S13), the delivery portion 16 retransmits packets that include only data of the fundamental component (S14). On this occasion, the delivery portion 16 transmits the packets including therein information (for example, flag) indicating that the packets are ones that are retransmitted. This enables the wireless speaker 301SL and the wireless speaker 301SR to recognize the (retransmitted) packets that include duplicate audio data, thereby avoiding duplicate reproduction of the audio. Additionally, the retransmission of the fundamental component may be performed more than once.

The delivery portion 16 determines whether or not next data to further deliver exist (S15). When the PCM audio source data keep on being inputted to the external input portion 10 (S15: Y), the delivery portion 16 performs step S11. When input of the PCM audio source data to the external input portion 10 no longer exists (S15: N), the delivery portion 16 ends the process. That is, as long as the PCM audio source data keep on being inputted to the external input portion 10, the delivery portion 16 performs steps S11-S14 repeatedly.

The delivery portion 16, immediately transmitting without buffering PCM audio source data that are inputted to the external input portion 10, can deliver the PCM audio source data to the wireless speaker 301SL and the wireless speaker 301SR faster.

Also, because the delivery portion 16 delivers the packets that include the data of the fundamental component twice, the wireless speaker 301SL and the wireless speaker 301SR receive data of the fundamental component more surely even when packet loss occurs. This enables the wireless speaker 301SL and the wireless speaker 301SR to reproduce the audio using the data of the fundamental component that can be received more surely; therefore, there is no need to make a request for retransmission of the audio data. In this manner, by rendering the time for retransmission of the audio data unnecessary, the AV receiver 100 can prevent the delay in reproduction of the audio at the wireless speaker 301SL and the wireless speaker 301SR.

As described above, the AV receiver 100 prevents the delay in delivery of the audio data that require real-time reproduction, and delivers the audio data that do not require real-time reproduction in a state of high quality. Thus, the AV receiver 100 can select an optimal method of delivery depending on audio data that become objects of delivery.

Moreover, although the speaker 200L and the speaker 200R are connected to the AV receiver 100 in this embodiment, they may be directly connected to the player 150 using speaker cables. Even in the case where the speaker 200L and the speaker 200R are directly connected to the player 150, the AV receiver 100, when delivering the PCM audio source data inputted to the external input portion 10 (S2: EXTERNAL INPUT PORTION), transmits only the data of the fundamental component of the compressed PCM audio source data twice, without buffering the PCM audio source data. This enables the AV receiver 100 to prevent the delay in reproduction of the audio at the wireless speaker 301SL and the wireless speaker 301SR, even in the case where the speaker 200L and the speaker 200R are directly connected to the player 150.

In addition, in this embodiment, the AV receiver 100 reproduces only audio data using the speaker 200L and the speaker 200R; however, it may reproduce video data, in addition to audio data. More specifically, to the external input portion 10, audio data and video data are inputted. The content reception portion 12 receives audio data and video data. The video data inputted to the external input portion 10 is output to the video output portion 18, as shown in FIG. 3. The video data received by the content reception portion 12 is output to the video output portion 18.

As shown in FIG. 3, the video output portion 18 includes a FIFO type buffer 19. In the case where the audio data received by the content reception portion 12 is delivered, the video output portion 18 temporarily holds the video data in the buffer 19, and thereafter outputs the video data to the television 210. The amount of the video data temporarily held in the buffer 19, as with the amount of the audio data temporarily held in the buffer 15, is set taking account of the time needed by the delivery portion 16 to perform the delivery process and the packet transmission, and the time needed by the wireless speaker 301SL and the wireless speaker 301SR to perform the reproduction process. This ensures that reproduction of the audio at the speaker 200L, the speaker 200R, the wireless speaker 301L and the wireless speaker 301R and reproduction of the video by the television 210 synchronize.

In the case where the delivery portion 16 delivers the audio data inputted to the external input portion 10, the video output portion 18 outputs the video data from the HDMI 6 to the television 210. Even in this case, the AV receiver 100, delivering only the data of the fundamental component of the audio data twice without buffering the audio data, can prevent the delay in reproduction of audio at the wireless speaker 301SL and the wireless speaker 301 SR in relation to the reproduction of video by the television 210.

Additionally, the external input portion 10 may include a composite terminal, apart from the HDMI 6. Further, the external input portion 10 may include a network interface (for example, wireless module 4) that receives content wirelessly transmitted continuously.

Also, the buffering process at step S21 may be performed any time before the transmission of packets (before S24). For example, the AV receiver 100 may temporarily hold, instead of the PCM audio source data themselves, the data of the fundamental component and the extended component of the PCM audio source data in the buffer 17.

Figure 5:
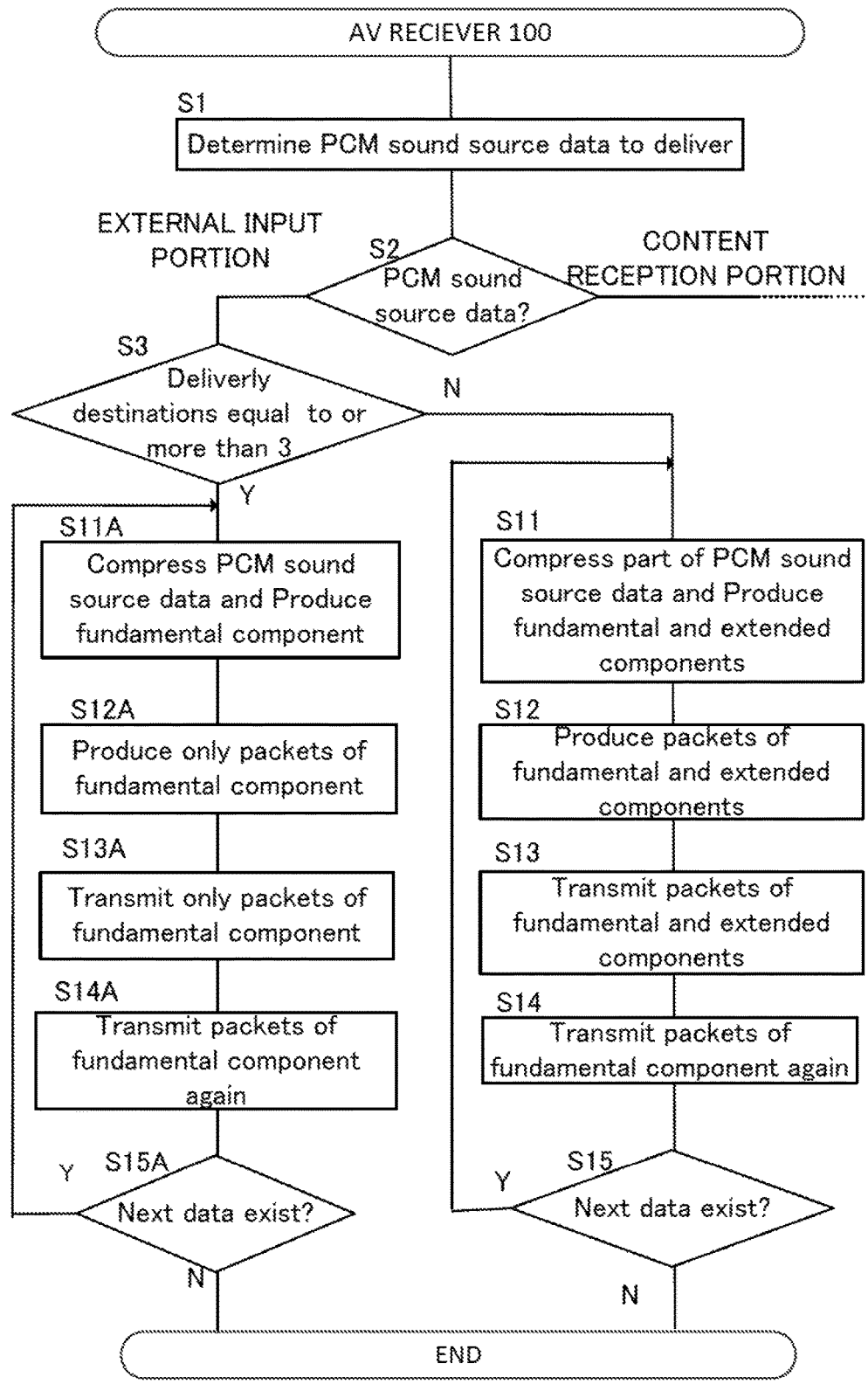
FIG. 5 is a flow chart showing an operation according to a modification of the operation of the AV receiver in the embodiment 1.

Next, FIG. 5 is a flow chart showing an operation according to a modification of the operation of the delivery portion 16. The flow chart of FIG. 5 differs from the flow chart shown in FIG. 4 in that the former performs step S3 and steps S11A-S15A. Additionally, in FIG. 5, illustration of steps S21-S24 that overlap with the flowchart of FIG. 4 is omitted.

The delivery portion 16, at step S3, referring to the memory 2 in which IP addresses of the wireless speakers are stored, determines whether or not number of the speakers as audio data destinations is equal to or more than 3 (S3).

When the number of the speakers as audio data destinations is equal to or more than 3 (S3: Y), the delivery portion 16 performs steps S11A-S15A sequentially. The delivery portion 16 produces only the data of the fundamental component of the PCM audio source data, and performs production and transmission of packets of only the data of the fundamental component as objects (S11A-S13A). Respective processes at step S14A and step S15A are the same as the respective processes at step S14 and step S15, so that explanation is omitted.

With the operation according to this modification, the delivery portion 16 can shorten the time required to produce and transmit the packets further. Therefore, the time needed until the audio data arrive at the wireless speaker 301SL and the wireless speaker 301SR is shortened further.

When the number of the speakers as audio data destinations is less than 3 (S3: N), the delivery portion 16 performs steps S11-S15 sequentially.

However, regardless of the number of the speakers as audio data destinations, the delivery portion 16 may deliver only the data of the fundamental component of the PCM audio source data inputted to the external input portion 10.

Also, although the content stored in the NAS 170 is delivered after being temporarily held in the buffer 17 in the above-mentioned embodiment, the content stored in a built-in storage in the AV receiver may be delivered after being temporarily held in the buffer 17.

Moreover, although the content delivered is illustrated as audio data in the above-mentioned embodiment, the content delivered may include video data. In order to compress the video data dividing thereof into a fundamental component and an extended component, for example, MPEG 4 SLS codec is used.

Also, the AV receiver 100 may deliver the content, not limited to Wi-Fi (a registered trademark) standard, using other wireless communication means such as Bluetooth (a registered trademark) standard and/or the like.

Examples of the content delivery apparatus may include audio amplifier, personal computer, reproduction apparatus such as set top box, amplifier integrated speaker and television, other than AV receiver. Examples of the client apparatus may include audio amplifier, AV receiver, personal computer, reproduction apparatus such as set top box, amplifier integrated speaker and television, other than wireless speaker.

The above explanations of the embodiments are nothing more than illustrative in any respect, and are not restrictive. Scope of the present invention is indicated by claims rather than the above embodiments. Further, it is intended that all changes that are equivalent to a claim in the sense and realm of the doctrine of equivalence be included within the scope of the present invention.

What is claimed is:

1. A content delivery apparatus comprising:
    an external input portion to which first content having a fundamental component and an extended component is inputted, the first content being audio data for which real-time reproduction related to an external video apparatus is required;
    a content reception portion that receives second content having the fundamental component and the extended component, the second content being audio data for which real-time reproduction related to the external video apparatus is not required; and
    a delivery portion that delivers the fundamental component and the extended component to a client apparatus by wireless communication and subsequently delivers the fundamental component more than once to the client apparatus when delivering the first content, wherein
        the client apparatus is a wireless speaker and receives the fundamental component of the first content more than once from the content delivery apparatus by the wireless communication; and
        the delivery portion delivers the fundamental component and the extended component to the client apparatus by the wireless communication when delivering the second content.

2. The content delivery apparatus according to claim 1 further comprising a buffer that temporarily holds the second content, wherein
    the content delivery portion delivers the fundamental component and the extended component of the second content after temporarily holding thereof in the buffer when delivering the second content.

3. The content delivery apparatus according to claim 2 comprising:
    a first buffer is the buffer;
    a second buffer that temporarily holds the second content, the second buffer being a separate buffer different from the first buffer; and
    a reproduction portion that reproduces the second content that is held in the second buffer.

4. The content delivery apparatus according to claim 1, wherein
    the delivery portion delivers the fundamental component of the first content without confirming a status of connection to the client apparatus when delivering the first content.

5. The content delivery apparatus according to claim 1, wherein
    the delivery portion does not deliver the extended component of the first content when delivering the first content.

6. The content delivery apparatus according to claim 1, wherein
    the delivery portion delivers the fundamental component of the first content without delivering the extended component thereof when delivering the first content if number of the client apparatus as delivery destinations is equal or more than a predetermined number.

7. The content delivery apparatus according to claim 1, wherein
    the fundamental component consists of data that have undergone irreversible compression; and
    the extended component consists of data to correct the fundamental component.

8. The content delivery apparatus according to claim 1, wherein
    the fundamental component is transmitted through connectionless communication.

9. A content delivery system comprising:
the content delivery apparatus according to claim 1; and
a client apparatus that receives the first content and the second content from the content delivery apparatus.

10. A content delivery method comprising:
inputting first content having a fundamental component and an extended component, or receiving second content having a fundamental component and the extended component, the first content being audio data for which real-time reproduction related to an external video apparatus is required, the second content being audio date for which real-time reproduction related to the external video apparatus is not required; and
delivering the fundamental component and the extended component to a client apparatus by wireless communication and subsequently delivering the fundamental component more than once to the client apparatus when delivering the first content, wherein
the client apparatus is a wireless speaker and receives the fundamental component of the first content more than once from a content delivery apparatus by the wireless communication; and
the delivering step delivers the fundamental component and the extended component to the client apparatus by the wireless communication when delivering the second content.

11. The content delivery method according to claim 10, the method including:
temporarily holding the second content in a buffer; and
delivering the fundamental component and the extended component of the second content after temporarily holding thereof in the buffer when delivering the second content.

12. The content delivery method according to claim 11, the method including:
temporarily holding the second content in a first buffer;
temporarily holding the second content in a second buffer that is a separate buffer different from the first buffer; and
reproducing the second content that is held in the second buffer.

13. The content delivery method according to claim 10, the method including:
delivering the fundamental component of the first content without confirming a status of connection to the client apparatus when delivering the first content.

14. The content delivery method according to claim 10, the method including:
not delivering the extended component of the first content when delivering the first content.

15. The content delivery method according to claim 10, the method including:
delivering the first content and the fundamental component of the first content without delivering the extended component of the first content when delivering the first content if number of the client apparatus as delivery destinations is equal or more than a predetermined number.

16. The content delivery method according to claim 10, the method including:
using the fundamental component consisting of data that have undergone irreversible compression, and
the extended component consisting of data to correct the fundamental component.

17. The content delivery method according to claim 10, the method including:
transmitting the fundamental component through connectionless communication.

* * * * *